US 12,450,869 B2

(12) United States Patent
He et al.

(10) Patent No.: US 12,450,869 B2
(45) Date of Patent: Oct. 21, 2025

(54) METHOD OF PROCESSING IMAGE, METHOD OF TRAINING MODEL, AND ELECTRONIC DEVICE

(71) Applicant: Apollo Intelligent Driving Technology (Beijing) Co., Ltd., Beijing (CN)

(72) Inventors: Yuzhe He, Beijing (CN); Yao Zhou, Beijing (CN); Shenhua Hou, Beijing (CN); Liang Peng, Beijing (CN); Guowei Wan, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 357 days.

(21) Appl. No.: 18/089,709

(22) Filed: Dec. 28, 2022

(65) Prior Publication Data
US 2023/0162474 A1 May 25, 2023

(30) Foreign Application Priority Data

Dec. 29, 2021 (CN) .......................... 202111635804.5

(51) Int. Cl.
*G06V 10/75* (2022.01)
*G06T 7/73* (2017.01)
(Continued)

(52) U.S. Cl.
CPC .............. *G06V 10/757* (2022.01); *G06T 7/74* (2017.01); *G06V 10/46* (2022.01); *G06V 10/764* (2022.01);
(Continued)

(58) Field of Classification Search
CPC .... G06V 10/757; G06V 10/46; G06V 10/764; G06V 10/7715; G06V 10/774;
(Continued)

(56) References Cited

U.S. PATENT DOCUMENTS 12,086,695 B2 * 9/2024 Park ..................... G06V 10/774
2021/0082144 A1 3/2021 Kadav et al.
(Continued)

FOREIGN PATENT DOCUMENTS

CN 101526944 A 9/2009
CN 110177278 A 8/2019
(Continued)

OTHER PUBLICATIONS

"Liu et al., DenserNet: Weakly Supervised Visual Localization Using Multi-Scale Feature Aggregation, 2021, In Proceedings of the AAAI conference on artificial intelligence, vol. 35, No. 7, pp. 6101-6109." (Year: 2021).*
(Continued)

*Primary Examiner* — Ming Y Hon
*Assistant Examiner* — Dominique James
(74) *Attorney, Agent, or Firm* — Keating & Bennett, LLP

(57) ABSTRACT

A method of processing an image, a method of training a multi-task processing model, and an electronic device, which relate to a field of an automatic driving technology, in particular to a field of high-definition map technology. The method of processing an image includes: processing a to-be-processed image to obtain a feature point of the to-be-processed image, a feature point descriptor map of the to-be-processed image, and a dense descriptor map of the to-be-processed image; determining a pair of matched feature points between the to-be-processed image and a reference image based on the feature point and the feature point descriptor map; and determining a pair of matched pixels between the to-be-processed image and the reference image based on the dense descriptor map.

14 Claims, 9 Drawing Sheets

(51) Int. Cl.
  *G06V 10/46*  (2022.01)
  *G06V 10/764* (2022.01)
  *G06V 10/77*  (2022.01)
  *G06V 10/774* (2022.01)
  *G06V 10/80*  (2022.01)

(52) U.S. Cl.
  CPC ........ *G06V 10/7715* (2022.01); *G06V 10/774* (2022.01); *G06V 10/806* (2022.01); *G06T 2207/20081* (2013.01)

(58) Field of Classification Search
  CPC .. G06V 10/806; G06V 10/751; G06V 10/462; G06T 7/74; G06T 2207/20081; G01C 21/3804; G06N 3/04; G06N 3/08
  See application file for complete search history.

(56) References Cited

U.S. PATENT DOCUMENTS

| | | | |
|---|---|---|---|
| 2021/0089890 A1* | 3/2021 | Tang | ........................ G06F 18/24 |
| 2021/0319236 A1 | 10/2021 | Tang et al. | |

FOREIGN PATENT DOCUMENTS

| | | | |
|---|---|---|---|
| CN | 110705365 | A | 1/2020 |
| CN | 110927743 | A | 3/2020 |
| CN | 111583340 | A | 8/2020 |
| CN | 111652240 | A | 9/2020 |
| CN | 112784743 | A | 5/2021 |
| CN | 113012208 | A | 6/2021 |
| CN | 113052311 | A | 6/2021 |
| CN | 113157962 | A | 7/2021 |
| CN | 113781532 | A | 12/2021 |
| JP | 2008-003766 | A | 1/2008 |

OTHER PUBLICATIONS

"Teichmann et al., MultiNet: Real-time Joint Semantic Reasoning for Autonomous Driving, 2018, IEEE Intelligent vehicles symposium (IV), pp. 1013-1020." (Year: 2018).*

"Yang et al., UR2KiD: Unifying Retrieval, Keypoint Detection, and Keypoint Description without Local Correspondence Supervision, 2020, arXiv preprint, pp. 1-12" (Year: 2020).*

Official Communication issued in corresponding Chinese Patent Application No. 202111635804.5, mailed on May 28, 2020.

Can et al., "A survey of image feature detection and matching methods", Journal of Nanjing University of Information Science and Technology (Natural Science Edition) 2020, vol. 12, No. 3, pp. 261-273.

Sindel et al., "Craquelurenet: matching the crack structure in historical paintings for multi-modal image registration", EEE International Conference on Image Processing (ICIP), 2021, pp. 994-998.

Yang et al., "UR2KiD: Unifying Retrieval, Keypoint Detection, and Keypoint Description without Local Correspondence Supervision", arXiv:2001.07252v1, Jan. 20, 2020, 12 pages.

Official Communication issued in corresponding European Patent Application No. 22216960.9, mailed on Apr. 4, 2023.

Wu et al., "Simultaneous Multi-Level Descriptor Learning and Semantic Segmentation for Domain-Specific Relocalization", 2021 IEEE International Conference on Robotics and Automation (ICRA 2021), May 31-Jun. 4, 2021, pp. 5868-5875.

Leng et al., "Local Feature Descriptor for Image Matching: A Survey", IEEE Access vol. 7, 2019, Dec. 20, 2018, pp. 6424-6434.

Yi et al., "LIFT: Learned Invariant Feature Transform", European Conference—Computer Vision—ECCV 2016, Part VI, LNCS 9910, 2016, pp. 467-483.

Official Communication issued in Japanese Patent Application No. 2022-205077, mailed on Oct. 12, 2023.

* cited by examiner

METHOD OF PROCESSING IMAGE, METHOD OF TRAINING MODEL, AND ELECTRONIC DEVICE

This application claims priority to Chinese Patent Application No. 202111635804.5, filed on Dec. 29, 2021, the entire content of which is incorporated herein in its entirety by reference.

TECHNICAL FIELD

The present disclosure relates to a field of an automatic driving technology, in particular to a field of a high-definition map technology, and more specifically, to a method of processing an image, a method of training a multi-task processing model, an electronic device, and a storage medium.

BACKGROUND

A high-definition positioning and navigation technology plays an indispensable role in a safe driving of an autonomous vehicle, and plays an important role in a lateral and longitudinal precise positioning, an obstacle detection and a collision avoidance, an intelligent speed control, a path planning and a behavioral decision of the autonomous vehicle. A high-definition map, also known as a HD map, is applied in the autonomous vehicle. The high-definition map, which has a precise location information of a vehicle and a rich road element data information, may help the vehicle predict a complex road information, such as slope, curvature, heading, etc., in order to better avoid a potential risk.

SUMMARY

The present disclosure provides a method of processing an image, a method of training a multi-task processing model, an electronic device, and a storage medium.

According to an aspect of the present disclosure, a method of processing an image is provided, including: processing a to-be-processed image to obtain a feature point of the to-be-processed image, a feature point descriptor map of the to-be-processed image, and a dense descriptor map of the to-be-processed image; determining a pair of matched feature points between the to-be-processed image and a reference image based on the feature point and the feature point descriptor map; and determining a pair of matched pixels between the to-be-processed image and the reference image based on the dense descriptor map.

According to another aspect of the present disclosure, a method of training a multi-task processing model is provided, including: training an initial multi-task processing model by using a training sample, so as to obtain the multi-task processing model, wherein the training sample includes a first sample image, a second sample image, a label for a pair of matched feature points between the first sample image and the second sample image, and a label for a pair of matched pixels between the first sample image and the second sample image, and wherein the label for the pair of matched feature points is configured to represent a matching relationship between a feature point of the first sample image and a feature point of the second sample image, and the label for the pair of matched pixels is configured to represent a matching relationship between a pixel point of the first sample image and a pixel point of the second sample image.

According to another aspect of the present disclosure, an electronic device is provided, including: at least one processor; and a memory communicatively connected to the at least one processor, wherein the memory stores instructions executable by the at least one processor, and the instructions, when executed by the at least one processor, are configured to cause the at least one processor to implement the methods as described in the present disclosure.

According to another aspect of the present disclosure, a non-transitory computer-readable storage medium having computer instructions therein is provided, wherein the computer instructions are configured to cause a computer system to implement the methods as described in the present disclosure.

According to another aspect of the present disclosure, an autonomous vehicle is provided, including the electronic device as described in the present disclosure.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure, wherein.

DETAILED DESCRIPTION OF EMBODIMENTS

Exemplary embodiments of the present disclosure will be described below with reference to the accompanying drawings, which include various details of embodiments of the present disclosure to facilitate understanding and should be considered as merely exemplary. Therefore, those of ordinary skilled in the art should realize that various changes and modifications may be made to embodiments described herein without departing from the scope and spirit of the present disclosure. Likewise, for clarity and conciseness, descriptions of well-known functions and structures are omitted in the following description.

The present disclosure provides a method and an apparatus of processing an image, a method and an apparatus of training a multi-task processing model, an electronic device, a storage medium, and a program product.

According to embodiments of the present disclosure, a method of processing an image is provided, including: processing a to-be-processed image to obtain a feature point of the to-be-processed image, a feature point descriptor map of the to-be-processed image, and a dense descriptor map of the to-be-processed image; determining a pair of matched feature points between the to-be-processed image and a reference image based on the feature point and the feature point descriptor map; and determining a pair of matched pixels between the to-be-processed image and the reference image based on the dense descriptor map.

In the technical solution of the present disclosure, an acquisition, a storage, a use, a processing, a transmission, a provision and a disclosure of position information involved comply with provisions of relevant laws and regulations, and do not violate public order and good custom.

Figure 1:
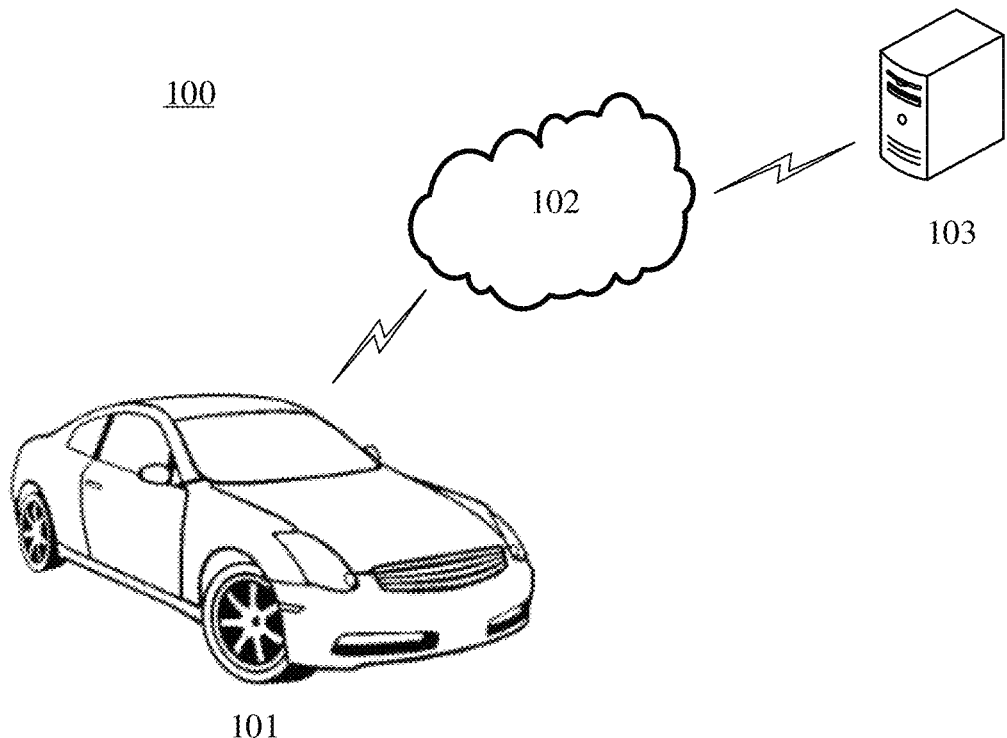
FIG. 1 schematically shows an exemplary system architecture in which a method and an apparatus of processing an image may be applied according to an embodiment of the present disclosure.

FIG. 1 schematically shows an exemplary system architecture in which a method and an apparatus of processing an image may be applied according to an embodiment of the present disclosure.

It should be noted that FIG. 1 shows only an example of a system architecture in which embodiments of the present disclosure may be applied, so as to help those skilled in the art understand the technical content of the present disclosure, but it does not mean that embodiments of the present disclosure may not be applied to other devices, systems, environments or scenarios.

As shown in FIG. 1, a system architecture 100 according to the embodiment may include an autonomous vehicle 101, a network 102, and a server 103. The network 102 is used to provide a medium of a communication link between the autonomous vehicle 101 and the server 103. The network 102 may include various connection types, such as a wireless communication link.

The autonomous vehicle 101 may be used by a user to interact with the server 103 through the network 102, so as to receive or send video stream data, positioning information, etc.

The server 103 may be a server providing various services, such as a background management server (for example only) that provides a support for a user to utilize the to-be-processed image processed by the autonomous vehicle 101, a navigation of the selected target location. The background management server may analyze and process received data such as a user request, etc., and feedback a processing result (such as a web page, information, or data, etc. obtained or generated according to the user request) to the autonomous vehicle 101.

The autonomous vehicle 101 may be installed with an information acquisition device for an image acquisition, such as a fish-eye camera, and/or a gun camera. The autonomous vehicle 101 may acquire the to-be-processed image by using the information acquisition device.

It should be noted that the method of processing the image provided in embodiments of the present disclosure may generally be performed by the autonomous vehicle 101. Accordingly, the apparatus of processing the image provided by the embodiment of the present disclosure may also be provided in the autonomous vehicle 101.

Alternatively, the method of processing the image provided in embodiments of the present disclosure may be generally performed by the server 103. Accordingly, the apparatus of processing the image provided in embodiments of the present disclosure may be generally provided in the server 103. The method of processing the image provided in embodiments of the present disclosure may also be performed by a server or a server cluster that is different from the server 103 and capable of communicating with the autonomous vehicle 101 and/or the server 103. Accordingly, the apparatus of processing the image provided in embodiments of the present disclosure may also be provided in the server or server cluster that is different from the server 103 and capable of communicating with the autonomous vehicle 101 and/or the server 103.

It should be understood that the number of autonomous vehicles, networks and image acquisition devices shown in FIG. 1 is only schematic. According to implementation needs, any number of terminal devices, networks and servers may be provided.

It should be noted that the sequence numbers of the respective operations in the following methods are only used as representations of the operations for the ease of description, and should not be regarded as representing an execution order of the operations. Unless explicitly indicated, the methods do not need to be performed exactly in the orders shown.

Figure 2:
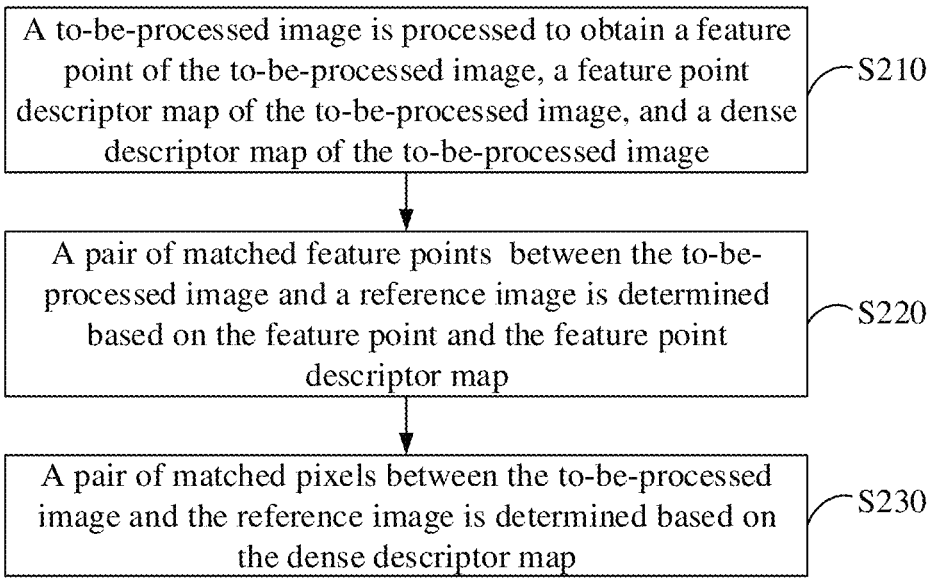
FIG. 2 schematically shows a flowchart of a method of processing an image according to an embodiment of the present disclosure.

FIG. 2 schematically shows a flowchart of a method of processing an image according to an embodiment of the present disclosure.

As shown in FIG. 2, the method includes operations S210 to S230.

In operation S210, a to-be-processed image is processed to obtain a feature point of the to-be-processed image, a feature point descriptor map of the to-be-processed image, and a dense descriptor map of the to-be-processed image.

In operation S220, a pair of matched feature points between the to-be-processed image and a reference image is determined based on the feature point and the feature point descriptor map.

In operation S230, a pair of matched pixels between the to-be-processed image and the reference image is determined based on the dense descriptor map.

According to embodiments of the present disclosure, the feature point may refer to a set of feature points, which may be a recognizable and representative point or a set of points in an image, such as a corner point, an edge, a block, etc. The feature point may remain unchanged even if a camera angle of view changes a little.

According to embodiments of the present disclosure, the feature point may include a position information. However, the present disclosure is not limited to this. The feature point may also include an information such as an orientation, a size, etc. The feature point may be used to perform matching and correlation between respective target objects of at least two images.

According to embodiments of the present disclosure, the feature point descriptor map may refer to a vector, and a feature point descriptor describes information associated with the feature point, for example, information of a pixel around the feature point. If the feature point descriptors of two images, such as the to-be-processed image and the reference image, are close to each other in distance in a vector space or matched with each other, it may be determined that two feature points corresponding to the two feature point descriptors one by one are matched with each other, and may form the pair of matched feature points.

According to embodiments of the present disclosure, the to-be-processed image may refer to a video frame image at a current time instant, and the reference image may refer to a video frame image at a historical time instant, for example, the reference image is a previous video frame image of the video frame image at the current time instant. However, the present disclosure is not limited to this. The reference image may also be a historical video frame image spaced from the video frame image at the current time instant by a predetermined number of video frame images.

According to embodiments of the present disclosure, the pair of matched feature points between the to-be-processed image and the reference image may be determined based on the feature point of the to-be-processed image and the feature point descriptor map of the to-be-processed image and a reference feature point of the reference image and a reference feature point descriptor map of the reference image.

According to embodiments of the present disclosure, an operation such as a visual odometer or visual inertial odometer may be performed based on the pair of matched feature points. However, the present disclosure is not limited to this. An operation such as a sparse reconstruction or cloud mapping may also be performed based on the pair of matched feature points.

According to embodiments of the present disclosure, the dense descriptor map may refer to a descriptor map corresponding to a set of dense and discrete pixel points, relative to the feature point descriptor map, such as a descriptor map of a set of sparse and key feature points.

According to embodiments of the present disclosure, the pair of matched pixels between the to-be-processed image and the reference image may be determined based on the dense descriptor map of the to-be-processed image and a reference dense descriptor map of the reference image.

According to embodiments of the present disclosure, an operation such as a three-dimensional reconstruction of a set of scene objects, etc. may be performed based on the pair of matched pixels.

The to-be-processed image may be directly processed by using the method of processing the image provided in embodiments of the present disclosure, so as to obtain the feature point, the feature point descriptor map and the dense descriptor map of the to-be-processed image, so that the dense descriptor map used to perform the three-dimensional reconstruction of the set of scene objects may be obtained, and the matched feature points used to perform operations such as a visual odometer, a visual inertial odometer, a sparse reconstruction or cloud mapping, etc. may be obtained. Therefore, a plurality of tasks may be simultaneously processed to improve a timeliness of processing the plurality of tasks.

According to embodiments of the present disclosure, for operation S210, a multi-task processing model may be designed to process the to-be-processed image. For example, the to-be-processed image may be input into the multi-task processing model to obtain the feature point, the feature point descriptor map and the dense descriptor map of the to-be-processed image.

According to embodiments of the present disclosure, the reference image may also be input into the multi-task processing model to obtain the reference feature point, the reference feature point descriptor map and the reference dense descriptor map, so as to determine the pair of matched feature points between the to-be-processed image and the reference image based on the feature point, the feature point descriptor map, the reference feature point and the reference feature point descriptor map, and determine the pair of matched pixels between the to-be-processed image and the reference image based on the dense descriptor map and the reference dense descriptor map.

Figure 3:
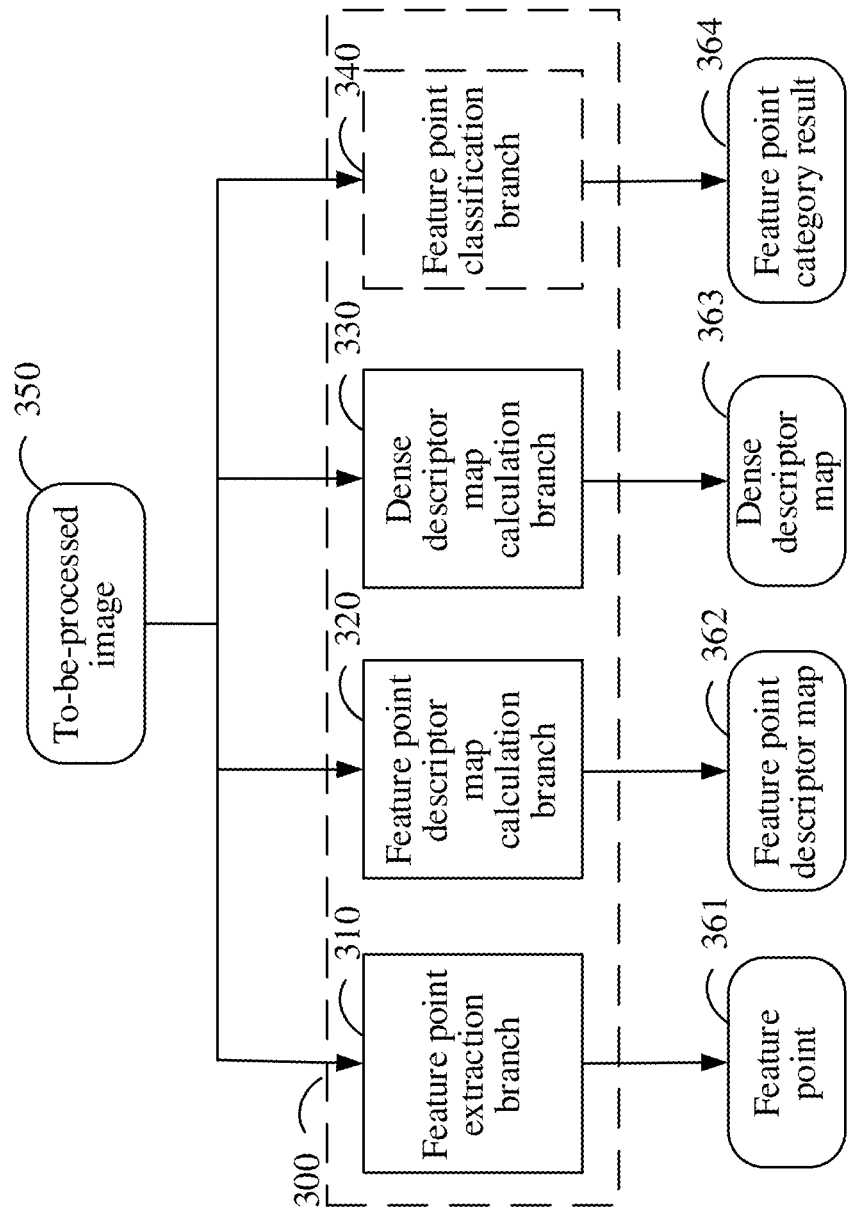
FIG. 3 schematically shows a network architecture diagram of a multi-task processing model according to an embodiment of the present disclosure.

FIG. 3 schematically shows a network architecture diagram of a multi-task processing model according to an embodiment of the present disclosure.

As shown in FIG. 3, a multi-task processing model 300 includes a feature point extraction branch 310, a feature point descriptor map calculation branch 320, a dense descriptor map calculation branch 330, and a feature point classification branch 340.

A to-be-processed image 350 may be input into the feature point extraction branch 310 to obtain a feature point 361. The to-be-processed image 350 is input into the feature point descriptor map calculation branch 320 to obtain a feature point descriptor map 362. The to-be-processed image 350 is input into the dense descriptor map calculation branch 330 to obtain a dense descriptor map 363. The to-be-processed image 350 is input into the feature point classification branch 340 to obtain a feature point category result 364.

According to embodiments of the present disclosure, the multi-task processing model may be designed to include a feature point extraction branch, a feature point descriptor map calculation branch, a dense descriptor map calculation branch and a feature point classification branch. However, the present disclosure is not limited to this. The multi-task processing model may also be designed to include the feature point extraction branch, the feature point descriptor map calculation branch, and the dense descriptor map calculation branch.

With the method of processing the image provided by embodiments of the present disclosure, the to-be-processed image may be processed by using the multi-task processing model, so that a plurality of processing results for executing the plurality of tasks may be obtained, and a real-time performance of a multi-task operation may be improved. In addition, based on the feature point classification branch in the multi-task processing model, a foreground feature point and a background feature point may be effectively distinguished by using the feature point category result, and the background feature point applied to a visual positioning and a sparse reconstruction task may be effectively screened out, so that an effectiveness of the pair of matched feature points between the to-be-processed image and the reference image may be increased.

According to embodiments of the present disclosure, the feature point extraction branch may include a plurality of feature point extraction sub branches, and each feature point extraction sub branch may include at least one feature extraction module and a convolution layer that are cascaded.

According to embodiments of the present disclosure, the feature point descriptor map calculation branch may include at least one feature extraction module and a convolution layer that are cascaded.

According to embodiments of the present disclosure, a high-resolution dense descriptor map calculation sub branch or a low-resolution dense descriptor map calculation sub branch may include at least one feature extraction module and a fully convolution module that are cascaded.

According to embodiments of the present disclosure, the feature extraction module in the feature point extraction sub branch, the feature point descriptor map calculation branch, the high-resolution dense descriptor map calculation sub branch or the low-resolution dense descriptor map calculation sub branch may include a convolution layer, a pooling layer, or a convolution layer and a pooling layer that are cascaded.

According to embodiments of the present disclosure, the fully convolution module in the high-resolution dense descriptor map calculation sub branch or the low-resolution dense descriptor map calculation sub branch includes a plurality of stacked fully convolution layers.

According to embodiments of the present disclosure, the feature point classification branch includes a plurality of feature point classification sub branches, a fusion module, and a classifier, and each of the plurality of feature point classification sub branches includes a feature point classification extraction module, an encoder, and a fusion module.

According to embodiments of the present disclosure, the inputting the to-be-processed image into the feature point classification branch to obtain a feature point category result may include the following operations.

For example, the to-be-processed image is input into the plurality of feature point classification extraction modules, respectively, so as to obtain a plurality of feature point category feature maps, where the plurality of feature point category feature maps correspond to the plurality of feature point classification extraction modules one by one; for each feature point category feature map of the plurality of feature point category feature maps, the feature point category feature map is input into the encoder so as to obtain a plurality of encoded sub feature point category feature maps, where the plurality of encoded sub feature point category feature maps correspond to a plurality of encoders one by one; the plurality of encoded sub feature point category feature maps are processed by using the fusion module, so as to obtain a fused feature point category map; and the fused feature point category map is processed by using the classifier, so as to obtain the feature point category result.

Figure 4A:
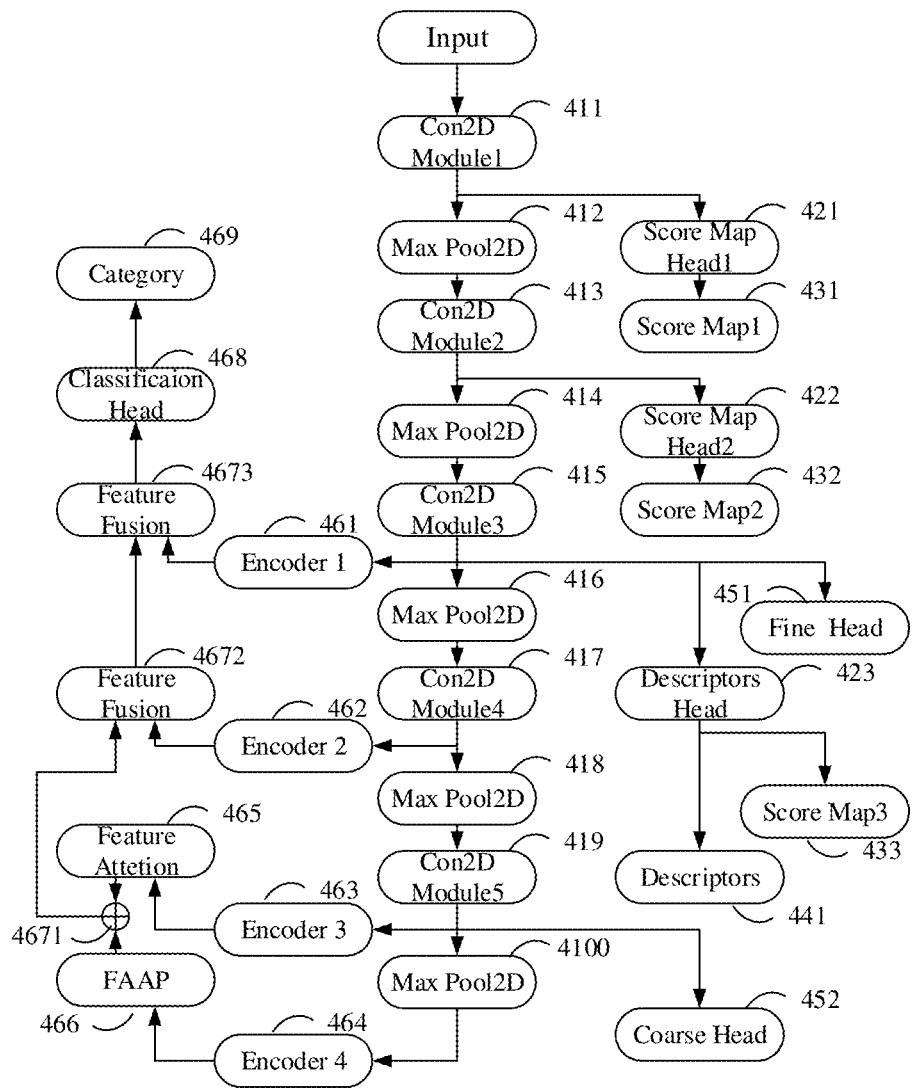
FIG. 4A schematically shows a network architecture diagram of a multi-task processing model according to another embodiment of the present disclosure.

FIG. 4A schematically shows a network architecture diagram of a multi-task processing model according to another embodiment of the present disclosure.

As shown in FIG. 4A, the feature point extraction branch may include a first feature point extraction sub branch, a second feature point extraction sub branch, and a third feature point extraction sub branch. The first feature point extraction sub branch may include a first feature extraction module and a first feature point extraction head 421 (Score Map Head 1) that are cascaded. The first feature extraction module includes a first convolution layer 411, and the first feature point extraction head 421 includes a convolution layer. The second feature point extraction sub branch may include the first feature extraction module, a second feature extraction module and a second feature point extraction head 422 (Score Map Head 2) that are cascaded. The second feature extraction module may include a first pooling layer 412 and a second convolution layer 413 that are cascaded, and the second feature point extraction head 422 may include a convolution layer. The third feature point extraction sub branch may include the first feature extraction module, the second feature extraction module, a third feature extraction module and a third feature point extraction head 423 (Descriptors Head) that are cascaded. The third feature extraction module may include a second pooling layer 414 and a third convolution layer 415 that are cascaded. The third feature point extraction head 423 may include cascaded five fully convolution layers with 128 channels.

Inputs of the first feature point extraction sub branch, the second feature point extraction sub branch and the third feature point extraction sub branch are the to-be-processed image. Outputs of the first feature point extraction sub branch, the second feature point extraction sub branch and the third feature point extraction sub branch are feature point scoring maps, respectively, such as a first feature point scoring map 431, a second feature point scoring map 432 and a third feature point scoring map 433. The first feature point scoring map 431, the second feature point scoring map 432 and the third feature point scoring map 433 have different feature scales from each other.

As shown in FIG. 4A, the feature point descriptor map calculation branch may include the first feature extraction module, the second feature extraction module, the third feature extraction module, and the third feature point extraction head 423 (Descriptors Head). An input of the feature point descriptor map calculation branch may be the to-be-processed image, and an output of the feature point descriptor map calculation branch may be a 128-dimensional dense feature point descriptor map 441.

As shown in FIG. 4A, the high-resolution dense descriptor map calculation sub branch may include the first feature extraction module, the second feature extraction module, the third feature extraction module, and a local dense network head 451 (Sparse to Dense Fine Descriptors Head). The local dense network head 451 includes a plurality of convolution layers that are cascaded. The low-resolution dense descriptor map calculation sub branch may include the first feature extraction module, the second feature extraction module, the third feature extraction module, a fourth feature extraction module, a fifth feature extraction module, and a semantic dense network head 452 (Sparse to Dense Coarse Descriptors Head). The fourth feature extraction module may include a third pooling layer 416 and a fourth convolution layer 417 that are cascaded. The fifth feature extraction module may include a fourth pooling layer 418 and a fifth convolution layer 419 that are cascaded. The semantic dense network head 452 may include the plurality of convolutional layers that are cascaded.

Inputs of the high-resolution dense descriptor map calculation sub branch and the low-resolution dense descriptor map calculation sub branch may be the to-be-processed image, and outputs of the high-resolution dense descriptor map calculation sub branch and the low-resolution dense descriptor map calculation sub branch may be the high-resolution dense descriptor map and the low-resolution dense descriptor map, respectively. A resolution of the high-resolution dense descriptor map is greater than a resolution of the low-resolution dense descriptor map.

As shown in FIG. 4A, the feature point classification branch may include a first feature point classification sub branch, a second feature point classification sub branch, a third feature point classification sub branch and a fourth feature point classification sub branch, a fusion module, and a classifier. The first feature point classification sub branch, the second feature point classification sub branch, the third feature point classification sub branch and the fourth feature point classification sub branch are connected in parallel. The first feature point classification sub branch may include the first feature extraction module, the second feature extraction module, the third feature extraction module and an encoder 461 (Encoder 1) that are cascaded. The second feature point classification sub branch may include the first feature extraction module, the second feature extraction module, the third feature extraction module, the fourth feature extraction module and an encoder 462 (Encoder 2) that are cascaded. The third feature point classification sub branch may include the first feature extraction module, the second feature extraction module, the third feature extraction module, the fourth feature extraction module, the fifth feature extraction module and an encoder 463 (Encoder 3) that are cascaded. The fourth feature point classification sub branch may include the first feature extraction module, the second feature extraction module, the third feature extraction module, the fourth feature extraction module, the fifth feature extraction module, a sixth feature extraction module and an encoder 464 (Encoder 4) that are cascaded. The sixth feature extraction module may include a fifth pooling layer 4100.

As shown in FIG. 4A, inputs of the first feature point classification sub branch, the second feature point classification sub branch, the third feature point classification sub branch and the fourth feature point classification sub branch may be the to-be-processed image. Outputs of the first feature point classification sub branch, the second feature point classification sub branch, the third feature point classification sub branch and the fourth feature point classification sub branch may be a first encoded sub feature point category feature map, a second encoded sub feature point category feature map, a third encoded sub feature point category feature map, and a fourth encoded sub feature point category feature map, respectively.

The third encoded sub feature point category feature map may be processed by designing a first self-attention module 465 (Feature Attention), so as to obtain a first high-level feature map that is weighted and adjusted. The fourth encoded sub feature point category feature map may be processed by using a second self-attention module 466 (FAAP, Feature Attention and Projection), so as to obtain a second high-level feature map that is weighted and adjusted. The first high-level feature map and the second high-level feature map may be fused by using an Add fusion module 4671, so as to obtain a first fused feature point category feature map. The first fused feature point category feature map and the second encoded sub feature point category feature map may be fused by using a first fusion module 4672 (Feature Fusion), so as to obtain a second fused feature point category feature map. The second fused feature point category feature map and the first encoded sub feature point category feature map may be fused by using a second fusion module 4673, so as to obtain a fused feature point category feature map. The fused feature point category feature map may be processed by using a classifier 468, so as to obtain a feature point category result 469. It may be determined whether the feature point belongs to a foreground feature point or a background feature point based on the feature point category result.

According to embodiments of the present disclosure, a backbone network module may be obtained by cascading the first feature extraction module, the second feature extraction module, the third feature extraction module, the fourth feature extraction module, the fifth feature extraction module, and the sixth feature extraction module. The backbone network module may adopt a VGG network structure. The backbone network module may be used to extract feature maps of six different scales, which is convenient for the feature point extraction branch, the feature point descriptor map calculation branch, the dense descriptor map calculation branch and the feature point classification branch to reuse. The feature point extraction branch, the feature point descriptor map calculation branch, the dense descriptor map calculation branch and the feature point classification branch reuse the backbone network module, which may improve an operation efficiency of the multi-task processing model.

Figure 4B:
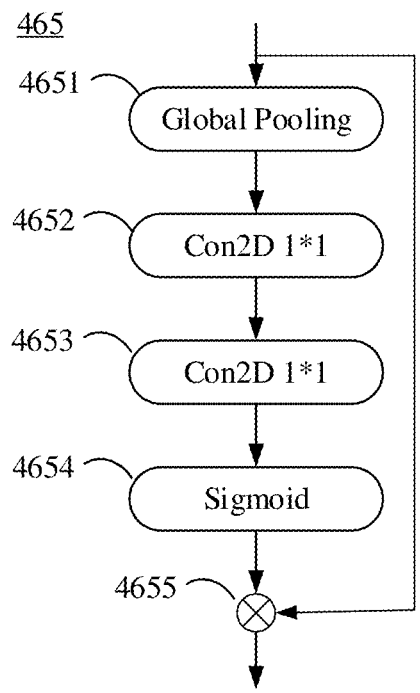
FIG. 4B schematically shows a network architecture diagram of a first self-attention module according to another embodiment of the present disclosure.

FIG. 4B schematically shows a network architecture diagram of a first self-attention module according to another embodiment of the present disclosure.

As shown in FIG. 4B, the first self-attention module 465 may include a classification pooling layer 4651, a first classification convolution layer 4652, a second classification convolution layer 4653, an activation layer 4654, and a first classification fusion layer 4655 that are cascaded. The third encoded sub feature point category feature map may be input into the first sub attention module 465 and processed by a classification pooling layer 4651, a first classification convolution layer 4652, a second classification convolution layer 4653, and an activation layer 4654, respectively, so as to obtain an activation feature map. Then, the activation feature map and the third encoded sub feature point category feature map may be fused by using the first classification fusion layer 4655, so as to obtain the first high-level feature map.

Figure 4C:
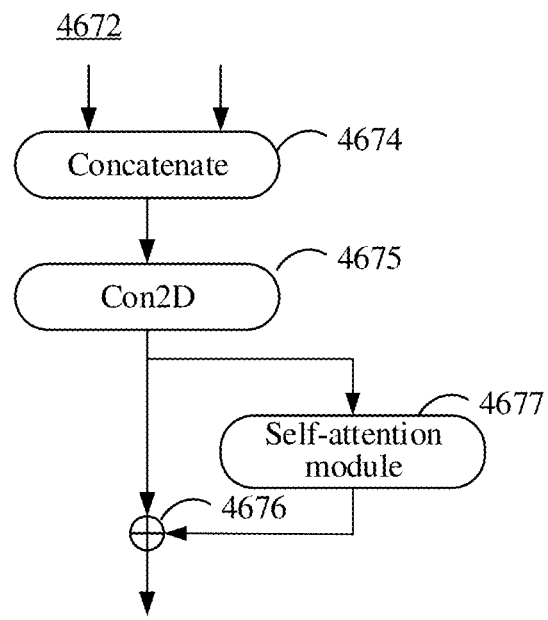
FIG. 4C schematically shows a network architecture diagram of a fusion module according to another embodiment of the present disclosure.

FIG. 4C schematically shows a network architecture diagram of a fusion module according to another embodiment of the present disclosure.

As shown in FIG. 4C, the first fusion module 4672 or the second fusion module 4673 may include a concatenating layer (Concatenate) 4674, a third classification convolution layer 4675 and a second classification fusion layer 4676 that are cascaded. The first fusion module 4672 or the second fusion module 4673 also includes a third self-attention module 4677. The concatenating layer 4674 may fuse two inputs, and the third classification convolution layer 4675 may process the fused result, so as to obtain a classification feature extraction result. The classification feature extraction result is input into the third self-attention module 4677 to obtain an output result. The output result and the classification feature extraction result may be fused by using the second classification fusion layer 4676, so as to obtain the fused feature point category feature map, for example.

Figure 4D:
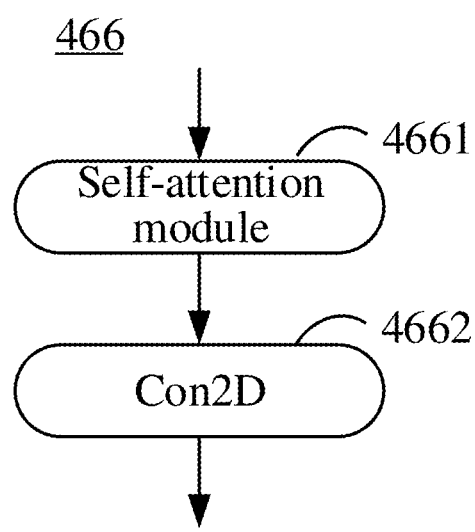
FIG. 4D schematically shows a network architecture diagram of a second self-attention module according to another embodiment of the present disclosure.

FIG. 4D schematically shows a network architecture diagram of a second self-attention module according to another embodiment of the present disclosure.

As shown in FIG. 4D, the second self-attention module 466 may include a fourth self-attention module 4661 and a fourth classification convolution layer 4662 that are cascaded. An input of the second self-attention module 466 may be the fourth encoded sub feature point category feature map, and an output of the second self-attention module 466 may be the second high-level feature map.

According to embodiments of the present disclosure, the inputting the to-be-processed image into the feature point extraction branch to obtain the feature point may include the following operations.

For example, the to-be-processed image is input into the plurality of feature point extraction sub branches, respectively, so as to obtain a plurality of feature point scoring maps, where the plurality of feature point scoring maps correspond to the plurality of feature point extraction sub branches one by one. For example, the number of feature point extraction sub branches may be three. The plurality of feature point scoring maps of different scales, such as three feature point scoring maps $s_0$, $s_1$ and $s_2$ of different scales, may be extracted by using the plurality of feature point extraction sub branches.

A weighted summation may be performed on the plurality of feature point scoring maps, as shown in Equation (1):

$$s = \alpha_0 s_0 + \alpha_1 s_1 + \alpha_2 s_2 \qquad (1),$$

so as to obtain a target feature point scoring map S.

An interpolation processing may be performed on the target feature point scoring map to obtain the feature point. For example, extracted feature points may be prevented from clustering together by using a non-maximum suppression method, and then a sparse feature point may be extracted from the target feature point scoring map.

For example, the target feature point scoring map may be processed by difference methods shown in Equations (2) and (3), so as to obtain a position information of a feature point with a sub-pixel precision. The Equation (2) is expressed as:

$$s\left(\begin{bmatrix} x \\ y \end{bmatrix}\right) = s\left(\begin{bmatrix} x_0 \\ y_0 \end{bmatrix}\right) + \begin{bmatrix} \frac{\partial s}{\partial x} & \frac{\partial s}{\partial y} \end{bmatrix}\left(\begin{bmatrix} x \\ y \end{bmatrix} - \begin{bmatrix} x_0 \\ y_0 \end{bmatrix}\right) + \qquad (2)$$
$$\frac{1}{2}\left(\begin{bmatrix} x \\ y \end{bmatrix} - \begin{bmatrix} x_0 \\ y_0 \end{bmatrix}\right)^T \begin{bmatrix} \frac{\partial^2 s}{\partial x^2} & \frac{\partial^2 s}{\partial x \partial y} \\ \frac{\partial^2 s}{\partial x \partial y} & \frac{\partial^2 s}{\partial y^2} \end{bmatrix}\left(\begin{bmatrix} x \\ y \end{bmatrix} - \begin{bmatrix} x_0 \\ y_0 \end{bmatrix}\right).$$

The position information of the feature point with the sub-pixel precision may be obtained by derivation of the above-mentioned Equation (2).

The Equation (3) is expressed as:

$$\begin{bmatrix} x \\ y \end{bmatrix} = \begin{bmatrix} \frac{\partial^2 s}{\partial x^2} & \frac{\partial^2 s}{\partial x \partial y} \\ \frac{\partial^2 s}{\partial x \partial y} & \frac{\partial^2 s}{\partial y^2} \end{bmatrix}^{-1} \begin{bmatrix} \frac{\partial s}{\partial x} \\ \frac{\partial s}{\partial y} \end{bmatrix} + \begin{bmatrix} x_0 \\ y_0 \end{bmatrix}, \qquad (3)$$

where, (x, y) is a position information of the feature point with the sub-pixel precision, and ($x_0$, $y_0$) is a position information of a feature point with an integer precision.

According to embodiments of the present disclosure, based on a scoring result of each feature point in the feature point scoring map, the scores may be sorted in descending order, and at least one key pixel point ranked at top may be obtained as the feature point according to the target number. However, the present disclosure is not limited to this. A threshold value may also be predetermined, and at least one key pixel point whose scoring result is greater than the threshold value may be used as the feature point.

According to embodiments of the present disclosure, for operation S220, the pair of matched feature points between the to-be-processed image and the reference image may be determined based on the feature point and the feature point descriptor map. However, the present disclosure is not limited to this. The pair of matched feature points between the to-be-processed image and the reference image may also be determined based on the target feature point and the feature point descriptor map.

According to other embodiments of the present disclosure, the feature point may be screened based on the feature point category result, so as to determine a target feature point. The pair of matched feature points between the to-be-processed image and the reference image may be determined based on the target feature point and the feature point descriptor map.

According to embodiments of the present disclosure, the target feature point may be a feature point of a target object in a stationary state, such as a background feature point of a background target object. For example, a dynamic foreground feature point of a foreground target object may be filtered out by using the feature point category result, and the target feature point may be retained, so as to solve a problem of poor accuracy and robustness of tasks such as a visual positioning and a sparse reconstruction caused by extracting the foreground feature point of the foreground target object.

According to other embodiments of the present disclosure, the target feature point scoring map may also be screened by using the feature point category result, so as to determine a second target feature point scoring map. Difference processing is performed on the second target feature point scoring map to obtain the target feature point. Thus, the pair of matched feature points between the to-be-processed image and the reference image may be determined based on the target feature point and the feature point descriptor map.

According to embodiments of the present disclosure, the feature point descriptor matched with the target feature point may be extracted from the feature point descriptor map based on the target feature point. Based on the target feature point and the feature point descriptor matched with the target feature point, the pair of matched feature points between the to-be-processed image and the reference image may be determined by using a feature point matching method.

According to embodiments of the present disclosure, according to a position information of the target feature point, a feature vector of the target feature point may be extracted from the feature point descriptor map by using a bilinear interpolation method, so as to obtain the feature point descriptor. However, the present disclosure is not limited to this. The extracted feature vector may also be normalized, and the normalized result may be used as the feature point descriptor.

According to embodiments of the present disclosure, the pair of matched feature points between the to-be-processed image and the reference image may be determined by using the feature point matching method. The feature point matching method include at least one selected from: a nearest neighbor matching method, a cross matching method, and/or a graph-network-based matching method.

According to embodiments of the present disclosure, when an angle of view between the to-be-processed image and the reference image does not change greatly, the pair of matched feature points may have a good matching effect and a fast matching speed by using the nearest neighbor matching method (KNN, K-Nearest Neighbor), and thus the pair of matched feature points may be better applied to a task of performing a visual odometer or visual inertial odometer.

According to embodiments of the present disclosure, in a complex scene, for example, when there are many dynamic foreground objects, the graph-network-based matching method may be used to achieve a high matching accuracy of the pair of matched feature points, and thus the pair of matched feature points may be better applied to sparse reconstruction and cloud mapping tasks.

Figure 5:
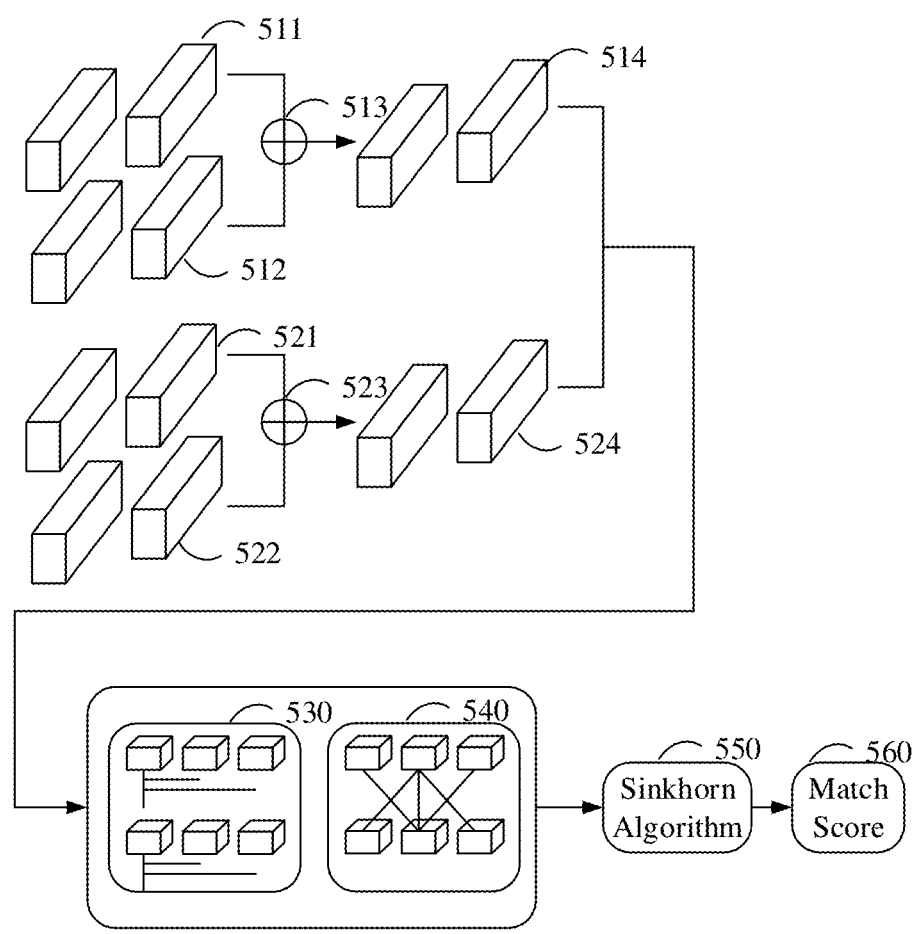
FIG. 5 schematically shows a network architecture diagram of a graph network according to an embodiment of the present disclosure.

FIG. 5 schematically shows a network architecture diagram of a graph network according to an embodiment of the present disclosure.

As shown in FIG. 5, the graph network may include a structure of a codec (Transform). A feature point descriptor 511 of the to-be-processed image, a target feature point 512 of the to-be-processed image, a reference feature point descriptor 521 of the reference image, and a reference feature point 522 of the reference image may be input into the graph network. A position encoder in the graph network may encode the position information of the target feature point and a scoring result of the target feature point into a 128-dimensional encoded feature vector. Then, the feature point descriptor and the encoded feature vector may be fused together by using a matching fusion module 513 (Add fusion module), so as to obtain a fused feature vector 514. Similarly, a reference position encoder connected in parallel with the position encoder in the graph network may encode a position information of the reference feature point and a scoring result of the reference feature point into a 128-dimensional reference encoded feature vector. Then, the reference feature point descriptor and the reference encoded feature vector may be fused by using the reference fusion module 523 (Add fusion module), so as to obtain a fused reference feature vector 524. The fused reference feature vector 524 and the fused feature vector 514 may be input into a self-attention module 530 and a cross attention module 540, and a target feature vector that fuses the to-be-processed image and the reference image may be output. A matching score (Match Score) 560 between the feature point of the to-be-processed image and the feature point of the reference image may be obtained by solving iteratively with a Sinkhorn Algorithm (optimal transmission) 550. For each feature point of the to-be-processed image, a feature point with the maximum matching score may be selected from the reference image as a matching point, so as to form the pair of matched feature points.

According to embodiments of the present disclosure, for operation S230, the determining a pair of matched pixels between the to-be-processed image and the reference image is determined based on the dense descriptor map may include the following operations.

For example, a candidate pair of matched pixels between the to-be-processed image and the reference image is determined based on a low-resolution dense descriptor map. The pair of matched pixels between the to-be-processed image and the reference image is determined from the candidate pixel pair based on a high-resolution dense descriptor map.

According to embodiments of the present disclosure, the dense descriptor map calculation branch may include a high-resolution dense descriptor map calculation sub branch and a low-resolution dense descriptor map calculation sub branch. The dense descriptor map may include a high-resolution dense descriptor map and a low-resolution dense descriptor map. The low-resolution dense descriptor map is obtained by processing the to-be-processed image using the low-resolution dense descriptor map calculation sub branch. The high-resolution dense descriptor map is obtained by processing the to-be-processed image using the high-resolution dense descriptor map calculation sub branch.

According to embodiments of the present disclosure, the low-resolution dense descriptor map, which may be referred to as a coarse feature map, may be a low-resolution descriptor map, for example, the resolution may be 1/16 of a resolution of the to-be-processed image. The high-resolution dense descriptor map, which may be referred to as a fine feature map, may be a high-resolution descriptor map, for example, the resolution may be 1/4 of the resolution of the to-be-processed image. A coarse-grained correlation may be performed on the pixel point by using the low-resolution dense descriptor map of the to-be-processed image and a reference low-resolution dense descriptor map of the reference image, so as to obtain the candidate pair of matched pixels between the to-be-processed image and the reference image. Then, a fine-grained correlation may be performed in the candidate pair of matched pixels by using the high-resolution dense descriptor map of the to-be-processed image and the reference high-resolution dense descriptor map of the reference image, so as obtain the pair of matched pixels between the to-be-processed image and the reference image and obtain an accurate position information of the pair of matched pixels.

Based on the method of determining the pair of matched pixels provided in embodiments of the present disclosure, a search range may be expanded by using the low-resolution dense descriptor map, so as to ensure a full matching, and an accurate positioning may be performed by using the high-resolution dense descriptor map, so as to ensure a matching accuracy. Then, the pair of matched pixels obtained by combining the low-resolution dense descriptor map with the high-resolution dense descriptor map is applied in a subsequent three-dimensional reconstruction task of the set of scene objects, which may achieve a good effect.

Figure 6:
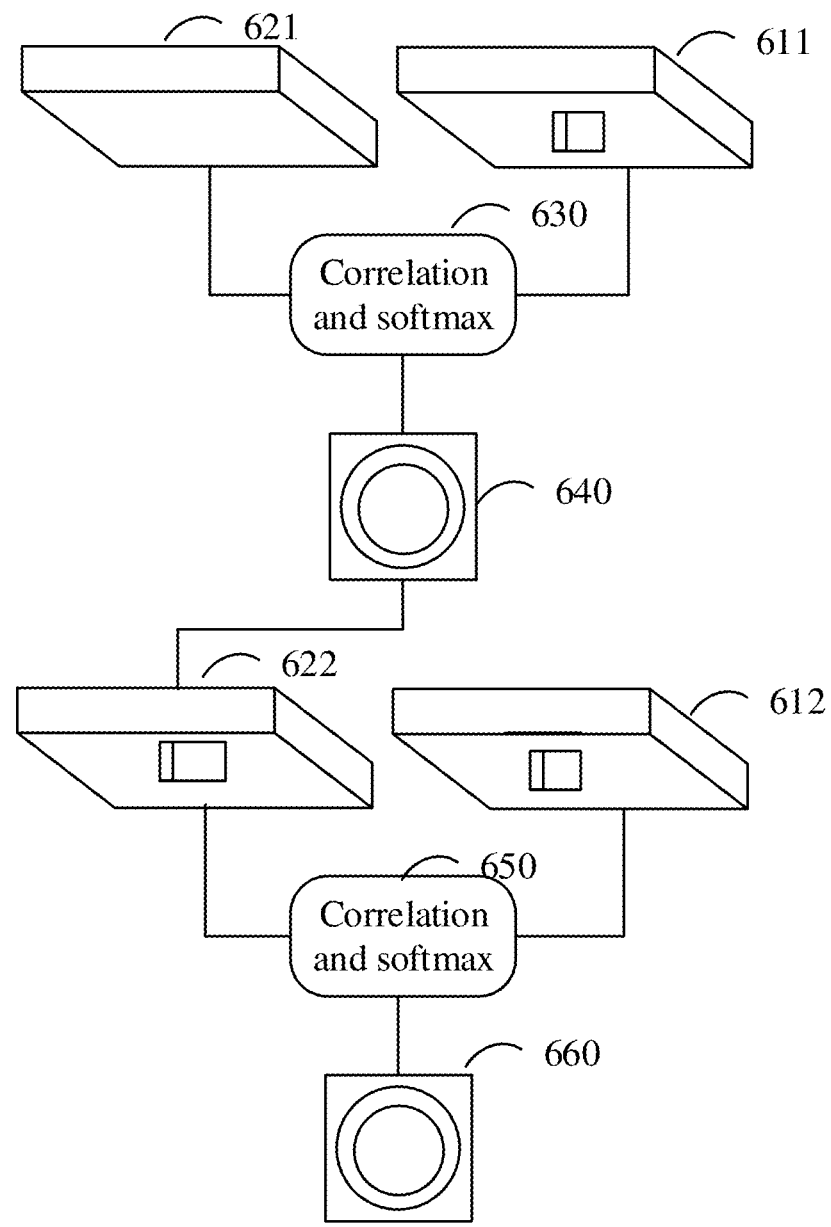
FIG. 6 schematically shows a flowchart of determining a pair of matched pixels according to an embodiment of the present disclosure.

FIG. 6 schematically shows a flowchart of determining apair of matched pixels according to an embodiment of the present disclosure.

As shown in FIG. 6, the candidate pair of matched pixels between the to-be-processed image and the reference image may be determined by using a correlation module. A low-resolution dense descriptor map 611 of the to-be-processed image and a reference low-resolution dense descriptor map 621 of the reference image may be input into a correlation module 630. The correlation module 630 is used to perform calculations such as Equations (4) and (5), so as to determine a candidate pair of matched pixels 640.

For example, a low-resolution dense descriptor map $F_c^0$ of the to-be-processed image and a reference low-resolution dense descriptor map $F_c^1$ of the reference image. A position $p^0$ (x, y) of a pixel point to be correlated in the to-be-processed image may be determined, a corresponding semantic dense descriptor $f_c^0=F_c^0(p^0)$ may be determined in the to-be-processed image, a correlation probability $P_c^1$ (x) between the pixel point and each pixel point of the reference image may be determined by using the semantic dense descriptor. An expected value $p_c^1$ of the position of the pixel point is obtained based on the correlation probability, so that a candidate correlation position information on the low-resolution dense descriptor map may be obtained, that is, the candidate pair of pixels may be obtained. Then, a high-resolution dense descriptor map 612 of the to-be-processed image and a reference high-resolution dense descriptor map 622 of the reference image are input into a correlation module 650, and a region of interesting (ROI) is delimited in the high-resolution dense descriptor map 612 of the to-be-processed image by the candidate correlation position information in the candidate pair of pixels 640. A local dense descriptor $F_f^0$ of the pixel point to be associated in the high-resolution dense descriptor map 612 of the to-be-processed image is determined by using the above-mentioned matching method, and a correlation probability between the pixel point and each pixel point in a candidate region of the reference high-resolution dense descriptor map 622 of the reference image is calculated. The expected value is calculated based on the correlation probability, so that a final correlation position information may be obtained to determine a pair of matched pixels 660. Equations (4) and (5) may be expressed as:

$$P_c^1(x) = \frac{\exp(F_c^0(p^0)^T F_c^1(x))}{\sum_y \exp(F_c^0(p^0)^T F_c^1(y))}, \quad (4)$$

$$p_c^1 = \sum_X x P_c^1(x). \quad (5)$$

Figure 7:
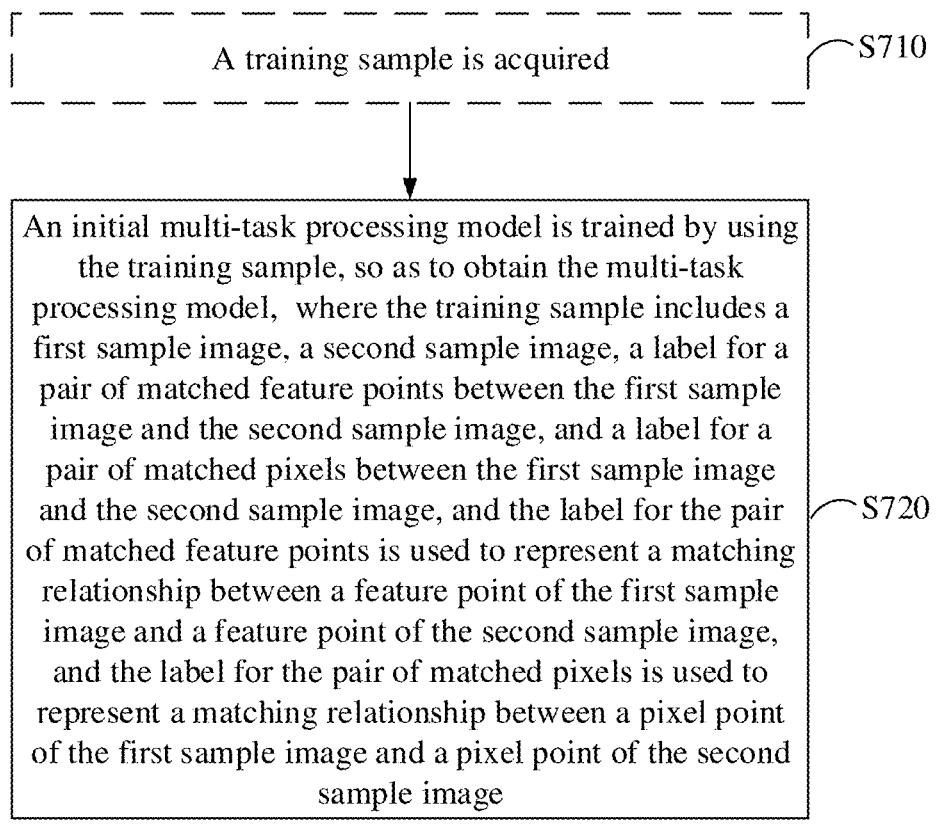
FIG. 7 schematically shows a flowchart of a method of training a multi-task processing model according to another embodiment of the present disclosure.

FIG. 7 schematically shows a flowchart of a method of training a multi-task processing model according to another embodiment of the present disclosure.

As shown in FIG. 7, the method includes operations S710 to S720.

In operation S710, a training sample is acquired.

In operation S720, an initial multi-task processing model is trained by using the training sample, so as to obtain the multi-task processing model, where the training sample includes a first sample image, a second sample image, a label for a pair of matched feature points between the first sample image and the second sample image, and a label for a pair of matched pixels between the first sample image and the second sample image, and where the label for the pair of matched feature points is used to represent a matching relationship between a feature point of the first sample image and a feature point of the second sample image, and the label for the pair of matched pixels is used to represent a matching relationship between a pixel point of the first sample image and a pixel point of the second sample image.

According to embodiments of the present disclosure, the method of training the multi-task processing model may include operation S710 and operation S720. However, the present disclosure is not limited to this. The method may also include only operation S720.

According to embodiments of the present disclosure, the initial multi-task processing model includes an initial feature point extraction branch and an initial feature point descriptor map calculation branch.

According to embodiments of the present disclosure, for operation S720, the training an initial multi-task processing model by using a training sample so as to obtain the multi-task processing model may include the following operations.

For example, the initial feature point extraction branch and the initial feature point descriptor map calculation branch are trained by using the first sample image, the second sample image, and the label for the pair of matched feature points between the first sample image and the second sample image, so as to obtain a feature point extraction branch and a feature point descriptor map calculation branch of the multi-task processing model.

According to embodiments of the present disclosure, the initial feature point extraction branch and the initial feature point descriptor map calculation branch may be trained together by using a training sample in a set of training samples of a 3D model reconstructed from images. A loss function loss $(I_1, I_2)$ shown in Equation (6) may be used for training. The Equation (6) may be expressed as:

$$\text{loss}(I_1, I_2) = \frac{1}{|\Omega|} \sum_{c \in \Omega} \frac{s_1^c s_2^c}{\sum_{q \in \Omega} s_1^q s_2^q} \quad (6)$$

$$\left( [D(f_1^c, f_2^c) - m_p]_+ + \left[ m_n - \min\left( \min_{k \neq c} D(f_1^c, f_2^k), \min_{k \neq c} D(f_1^k, f_2^c) \right) \right]_+ \right),$$

where, $s_1^c$ represents a calculated feature point score of a $c^{th}$ pixel point on a first sample image, $f_1^c$ represents a feature point descriptor of the $c^{th}$ pixel on the first sample image, D(.,.) represents a distance function of the feature point descriptor, $m_p$ and $m_n$ respectively represent constants, n represents the number of sets of pixel points, q represents a $q^{th}$ pixel point, [ ]$_+$ represents being greater than or equal to 0, and $I_1$ and $I_2$ represent a first sample image and a second sample image respectively.

According to embodiments of the present disclosure, the initial multi-task processing model may include an initial dense descriptor map calculation branch.

According to embodiments of the present disclosure, for operation S720, the training an initial multi-task processing model by using a training sample so as to obtain the multi-task processing model may include the following operations.

For example, the initial dense descriptor map calculation branch is trained by using the first sample image, the second sample image, and the label for the pair of matched pixels between the first sample image and the second sample image, so as obtain a dense descriptor map calculation branch of the multi-task processing model.

According to embodiments of the present disclosure, the initial dense descriptor map calculation branch may be trained by using the training sample in the set of training samples of the 3D model reconstructed from the images. A loss function loss shown in Equation (7) may be used for training. The Equation (7) may be expressed as:

$$\text{loss} = \sqrt[2]{(x_0-x)^2 + (y_0-y)^2} \quad (7),$$

where, (x, y) is a predicted position information of a pixel point in the second sample image that forms a pair of matched pixels with a target pixel point of the first sample image, and $(x_0, y_0)$ is a real position information of the pixel point in the second sample image that forms the pair of matched pixels with the target pixel point.

According to embodiments of the present disclosure, the initial multi-task processing model may further include an initial feature point classification branch.

According to embodiments of the present disclosure, for operation S720, the training an initial multi-task processing model by using a training sample so as to obtain the multi-task processing model may include the following operations.

For example, the initial feature point classification branch is trained by using a target sample image, a feature point label of the target sample image, and a category label of the target sample image, so as to obtain a feature point classification branch of the multi-task processing model, where the target sample image includes the first sample image and/or the second sample image; the feature point label of the target sample image is used to represent a probability value that a pixel point of the target sample image is a feature point; and the category label of the target sample image is used to represent a category of the pixel point.

According to embodiments of the present disclosure, the initial feature point classification branch may be trained by using a training sample in a set of training samples labeled with category labels. A loss function loss (I) may use a cross entropy loss function shown in Equation (8), for example. The Equation (8) is expressed as:

$$\text{loss}(I) = -\sum_{k \in N} \frac{\exp(s_k)}{\sum_{q \in \Omega} \exp(s_q)} (y_k \log(p_k) + (1 - y_k) \log(1 - p_k)), \quad (8)$$

where, $s_k$ represents a feature point score of a $k^{th}$ pixel point, $y_k \in \{0,1\}$ represents a category label of a pixel point, $p_k$ represents a prediction probability that the pixel point belongs to a foreground point, and q represents a $q^{th}$ pixel point.

According to embodiments of the present disclosure, the multi-task processing model may include a feature point extraction branch, a feature point descriptor map calculation branch, a dense descriptor map calculation branch, and a feature point classification branch. However, the present disclosure is not limited to this. The multi-task processing model may also include only the feature point extraction branch, the feature point descriptor map calculation branch, and the dense descriptor map calculation branch.

According to embodiments of the present disclosure, the feature point extraction branch may include a plurality of feature point extraction sub branches, and each feature point extraction sub branch may include at least one feature extraction module and a convolution layer that are cascaded.

According to embodiments of the present disclosure, the feature point descriptor map calculation branch may include at least one feature extraction module and a convolution layer that are cascaded.

According to embodiments of the present disclosure, the dense descriptor map calculation branch may include a high-resolution dense descriptor map calculation sub branch and a low-resolution dense descriptor map calculation sub branch. The high-resolution dense descriptor map calculation sub branch or the low-resolution dense descriptor map calculation sub branch may include at least one feature extraction module and a fully convolution module that are cascaded.

According to embodiments of the present disclosure, the feature extraction module in the feature point extraction sub branch, the feature point descriptor map calculation branch, the high-resolution dense descriptor map calculation sub branch or the low-resolution dense descriptor map calculation sub branch may include a convolution layer, a pooling layer, or a convolution layer and a pooling layer that are cascaded.

According to embodiments of the present disclosure, the fully convolution module in the high-resolution dense descriptor map calculation sub branch or the low-resolution dense descriptor map calculation sub branch includes a plurality of fully convolution layers that are cascaded.

According to the embodiment of the present disclosure, the feature point classification branch includes a plurality of feature point classification sub branches, a fusion module, and a classifier, and each of the plurality of feature point classification sub branches includes a feature point classification extraction module, an encoder, and the fusion module.

According to embodiments of the present disclosure, the feature point extraction branch, the feature point descriptor map calculation branch, the dense descriptor map calculation branch and the feature point classification branch may reuse a backbone network module. The backbone network module may use a VGG network structure. Before the backbone network module is used, a pre-training may be performed by using an ImageNet training set. When the initial multi-task processing model is trained, parameters of the backbone network module may be fixed, and parameters of the initial feature point extraction branch, the initial feature point descriptor map calculation branch, the initial dense descriptor map calculation branch and the initial feature point classification branch may be trained sequentially.

Figure 8:
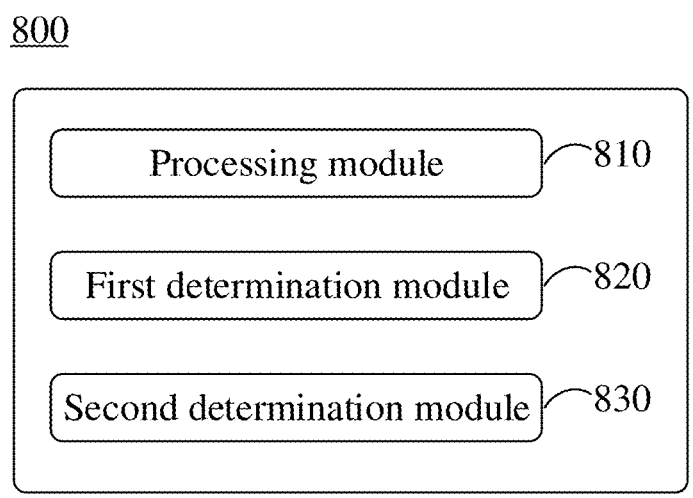
FIG. 8 schematically shows a block diagram of an apparatus of processing an image according to an embodiment of the present disclosure.

FIG. 8 schematically shows a block diagram of an apparatus of processing an image according to an embodiment of the present disclosure.

As shown in FIG. 8, an apparatus 800 of processing an image may include a processing module 810, a first determination module 820, and a second determination module 830.

The processing module 810 is used to process a to-be-processed image to obtain a feature point of the to-be-processed image, a feature point descriptor map of the to-be-processed image, and a dense descriptor map of the to-be-processed image.

The first determination module 820 is used to determine a pair of matched feature points between the to-be-processed image and a reference image based on the feature point and the feature point descriptor map.

The second determination module 830 is used to determine a pair of matched pixels between the to-be-processed image and the reference image based on the dense descriptor map.

According to embodiments of the present disclosure, the processing module may include a processing sub module.

The processing sub module is used to input the to-be-processed image into a multi-task processing model to obtain the feature point of the to-be-processed image, the feature point descriptor map of the to-be-processed image, and the dense descriptor map of the to-be-processed image.

According to embodiments of the present disclosure, the multi-task processing model includes a feature point extraction branch, a feature point descriptor map calculation branch and a dense descriptor map calculation branch.

According to embodiments of the present disclosure, the processing sub module may include a first processing unit, a second processing unit, and a third processing unit.

The first processing unit is used to input the to-be-processed image into the feature point extraction branch to obtain the feature point.

The second processing unit is used to input the to-be-processed image into the feature point descriptor map calculation branch to obtain the feature point descriptor map.

The third processing unit is used to input the to-be-processed image into the dense descriptor map calculation branch to obtain the dense descriptor map.

According to embodiments of the present disclosure, the multi-task processing model further includes a feature point classification branch.

According to embodiments of the present disclosure, the apparatus of processing the image may further include a fourth processing unit.

The fourth processing unit is used to input the to-be-processed image into the feature point classification branch to obtain a feature point category result, so as to determine the pair of matched feature points between the to-be-processed image and the reference image based on the feature point, the feature point descriptor map and the feature point category result.

According to embodiments of the present disclosure, the first determination module may include a screening unit and a determination unit.

The screening unit is used to screen the feature point based on the feature point category result, so as to determine a target feature point.

The determination unit is used to determine the pair of matched feature points between the to-be-processed image and the reference image based on the target feature point and the feature point descriptor map.

According to embodiments of the present disclosure, the determination unit may include an extraction sub unit and a first matching sub unit.

The extraction sub unit is used to extract, from the feature point descriptor map, a feature point descriptor matched with the target feature point based on the target feature point.

The first matching sub unit is used to determine, by using a feature point matching method, the pair of matched feature points between the to-be-processed image and the reference image based on the target feature point and the feature point descriptor matched with the target feature point.

According to embodiments of the present disclosure, the feature point extraction branch includes a plurality of feature point extraction sub branches.

According to embodiments of the present disclosure, the first processing unit may include a first input sub unit, a weighting sub unit, and an interpolation sub unit.

The first input sub unit is used to input the to-be-processed image into the plurality of feature point extraction sub branches respectively, so as to obtain a plurality of feature point scoring maps, where the plurality of feature point scoring maps correspond to the plurality of feature point extraction sub branches one by one.

The weighted sub unit is used to perform a weighted summation on the plurality of feature point scoring maps to obtain a target feature point scoring map.

The interpolation sub unit is used to perform an interpolation processing on the target feature point scoring map to obtain the feature point.

According to embodiments of the present disclosure, the dense descriptor map includes a high-resolution dense descriptor map and a low-resolution dense descriptor map.

According to embodiments of the present disclosure, the dense descriptor map calculation branch includes a high-resolution dense descriptor map calculation sub branch and a low-resolution dense descriptor map calculation sub branch.

According to embodiments of the present disclosure, the third processing unit may include a second matching sub unit and a third matching sub unit.

The second matching sub unit is used to determine a candidate pair of matched pixels between the to-be-processed image and the reference image based on the low-resolution dense descriptor map, where the low-resolution dense descriptor map is obtained by processing the to-be-processed image using the low-resolution dense descriptor map calculation sub branch.

The third matching sub unit is used to determine the pair of matched pixels between the to-be-processed image and the reference image from the candidate pair of matched pixels based on the high-resolution dense descriptor map, where the high-resolution dense descriptor map is obtained by processing the to-be-processed image using the high-resolution dense descriptor map calculation sub branch.

According to embodiments of the present disclosure, the feature point classification branch includes a plurality of feature point classification sub branches, a fusion module, and a classifier, and each of the plurality of feature point classification sub branches includes a feature point classification extraction module, an encoder, and a fusion module.

According to embodiments of the present disclosure, the fourth processing unit may include a second input sub unit, an encoding sub unit, a fusion sub unit, and a classification sub unit.

The second input subunit is used to input the to-be-processed image into the plurality of feature point classification extraction modules respectively, so as to obtain a plurality of feature point category feature maps, where the plurality of feature point category feature maps correspond to the plurality of feature point classification extraction modules one by one.

The encoding sub unit is used to input, for each of the plurality of feature point category feature maps, the feature point category feature map into the encoder, so as to obtain a plurality of encoded sub feature point category feature maps, where the plurality of encoded sub feature point category feature maps correspond to a plurality of encoders one by one.

The fusion sub unit is used to process the plurality of encoded sub feature point category feature maps by using the fusion module, so as to obtain a fused feature point category map.

The classification sub unit is used to process the fused feature point category map by using the classifier, so as to obtain the feature point category result.

According to embodiments of the present disclosure, the apparatus of processing the image may further include an input module.

The input module is used to input the reference image into the multi-task processing model to obtain a reference feature point, a reference feature point descriptor map and a reference dense descriptor map, so as to determine the pair of matched feature points between the to-be-processed image and the reference image based on the feature point, the feature point descriptor map, the reference feature point and the reference feature point descriptor map, and determine the pair of matched pixels between the to-be-processed image and the reference image based on the dense descriptor map and the reference dense descriptor map.

According to embodiments of the present disclosure, the high-resolution dense descriptor map calculation sub branch or the low-resolution dense descriptor map calculation sub branch includes: at least one feature extraction module and a fully convolution module that are cascaded.

The feature extraction module includes: a convolution layer, a pooling layer, or a convolution layer and a pooling layer that are cascaded. The fully convolution module includes a plurality of full convolution layers that are cascaded.

According to embodiments of the present disclosure, at least one of the plurality of feature point extraction sub branches includes: at least one feature extraction module and a convolution layer that are cascaded. The feature extraction module includes: a convolution layer, a pooling layer, or a convolution layer and a pooling layer that are cascaded.

According to embodiments of the present disclosure, the feature point descriptor map calculation branch includes: at least one feature extraction module and a convolution layer that are cascaded. The feature extraction module includes: a convolution layer, a pooling layer, or a convolution layer and a pooling layer that are cascaded.

According to embodiments of the present disclosure, the feature point matching method includes at least one selected from: a nearest neighbor matching method, a cross matching method, or a graph-network-based matching method.

Figure 9:
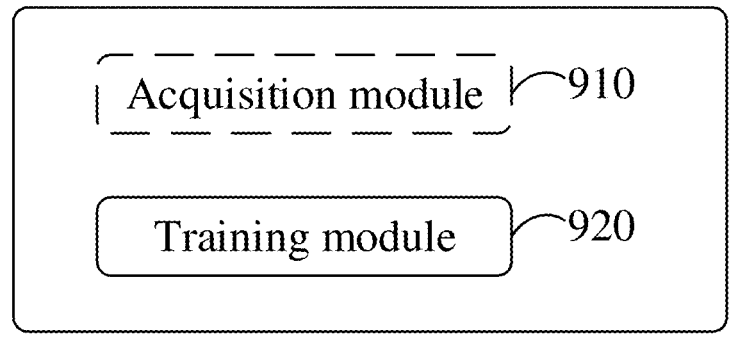
FIG. 9 schematically shows a block diagram of an apparatus of training a multi-task processing model according to another embodiment of the present disclosure.

FIG. 9 schematically shows a block diagram of an apparatus of training a multi-task processing model according to an embodiment of the present disclosure.

As shown in FIG. 9, an apparatus 900 of training a multi-task processing model may include an acquisition module 910 and a training module 920.

The acquisition module 910 is used to acquire a training sample.

The training module 920 is used to train an initial multi-task processing model by using the training sample, so as to obtain the multi-task processing model.

According to embodiments of the present disclosure, the training sample includes a first sample image, a second sample image, a label for a pair of matched feature points between the first sample image and the second sample image, and a label for a pair of matched pixels between the first sample image and the second sample image, and where the label for the pair of matched feature points is used to represent a matching relationship between a feature point of the first sample image and a feature point of the second sample image, and the label for the pair of matched pixels is used to represent a matching relationship between a pixel point of the first sample image and a pixel point of the second sample image.

According to embodiments of the present disclosure, the apparatus 900 of training the multi-task processing model may include an acquisition module 910 and a training module 920. However, the present disclosure is not limited to this. The apparatus may further include only the training module 920.

According to embodiments of the present disclosure, the initial multi-task processing model may include an initial feature point extraction branch and an initial feature point descriptor map calculation branch.

According to embodiments of the present disclosure, the training module may include a first training unit.

The first training unit is used to train the initial feature point extraction branch and the initial feature point descriptor map calculation branch by using the first sample image, the second sample image, and the label for the pair of matched feature points between the first sample image and the second sample image, so as to obtain a feature point extraction branch and a feature point descriptor map calculation branch in the multi-task processing model.

According to embodiments of the present disclosure, the initial multi-task processing model includes an initial dense descriptor map calculation branch.

According to embodiments of the present disclosure, the training module may include a second training unit.

The second training unit is used to train the initial dense descriptor map calculation branch by using the first sample image, the second sample image, and the label for the pair of matched pixels between the first sample image and the second sample image, so as obtain a dense descriptor map calculation branch in the multi-task processing model.

According to embodiments of the present disclosure, the initial multi-task processing model further includes an initial feature point classification branch.

According to embodiments of the present disclosure, the training module may include a third training unit.

The third training unit is used to train the initial feature point classification branch by using a target sample image, a feature point label of the target sample image, and a category label of the target sample image, so as to obtain a feature point classification branch of the multi-task processing model, where the target sample image includes the first sample image and/or the second sample image; the feature point label of the target sample image is used to represent a probability value that a pixel point of the target sample image is a feature point; and the category label of the target sample image is used to represent a category of the pixel point.

According to embodiments of the present disclosure, the present disclosure further provides an electronic device, a readable storage medium, an autonomous vehicle and a computer program product.

According to embodiments of the present disclosure, an electronic device is provided, including: at least one processor; and a memory communicatively connected to the at least one processor; where the memory stores instructions executable by the at least one processor, and the instructions, when executed by the at least one processor, are configured to cause the at least one processor to implement the methods according to embodiments of the present disclosure.

According to an embodiment of the present disclosure, a non-transitory computer-readable storage medium having computer instructions therein is provided, where computer instructions are used to cause a computer system to implement the methods according to embodiments of the present disclosure.

According to embodiments of the present disclosure, a computer program product containing a computer program is provided, where the computer program, when executed by a processor, is configured to cause the processor to implement the methods according to embodiments of the present disclosure.

Figure 10:
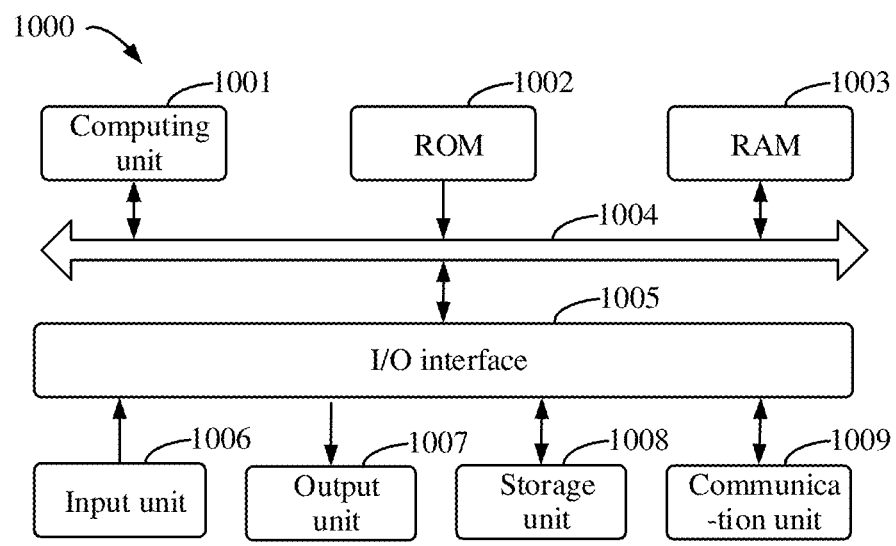
FIG. 10 schematically shows a block diagram of an electronic device suitable for implementing a method of processing an image according to an embodiment of the present disclosure.

FIG. 10 shows a schematic block diagram of an exemplary electronic device 1000 for implementing embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 10, the electronic device 1000 includes a computing unit 1001 which may perform various appropriate actions and processes according to a computer program stored in a read only memory (ROM) 1002 or a computer program loaded from a storage unit 1008 into a random access memory (RAM) 1003. In the RAM 1003, various programs and data necessary for an operation of the electronic device 1000 may also be stored. The computing unit 1001, the ROM 1002 and the RAM 1003 are connected to each other through a bus 1004. An input/output (I/O) interface 1005 is also connected to the bus 1004.

A plurality of components in the electronic device 1000 are connected to the I/O interface 1005, including: an input unit 1006, such as a keyboard, or a mouse; an output unit 1007, such as displays or speakers of various types; a storage unit 1008, such as a disk, or an optical disc; and a communication unit 1009, such as a network card, a modem, or a wireless communication transceiver. The communication unit 1009 allows the electronic device 1000 to exchange information/data with other devices through a computer network such as Internet and/or various telecommunication networks.

The computing unit 1001 may be various general-purpose and/or dedicated processing assemblies having processing and computing capabilities. Some examples of the computing units 1001 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 1001 executes various methods and steps described above, such as the method of processing the image or the method of training the multi-task processing model. For example, in some embodiments, the method of processing the image or the method of training the multi-task processing model may be implemented as a computer software program which is tangibly embodied in a machine-readable medium, such as the storage unit 1008. In some embodiments, the computer program may be partially or entirely loaded and/or installed in the electronic device 1000 via the ROM 1002 and/or the communication unit 1009. The computer program, when loaded in the RAM 1003 and executed by the computing unit 1001, may execute one or more steps in the method of processing the image or the method of training the multi-task processing model described above. Alternatively, in other embodiments, the computing unit 1001 may be configured to perform the method of processing the image or the method of training the multi-task processing model by any other suitable means (e.g., by means of firmware).

According to embodiments of the present disclosure, the present disclosure further provides an autonomous vehicle, which may include an electronic device, a communication device, an image acquisition device, etc.

According to embodiments of the present disclosure, the electronic device may be integrated with the communication device and an information acquisition device, or set separately with the communication device and the information acquisition device.

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable data processing apparatus, so that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with the user. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

The computer system may include a client and a server. The client and the server are generally far away from each other and usually interact through a communication network. The relationship between the client and the server is generated through computer programs running on the corresponding computers and having a client-server relationship with each other. The server may be a cloud server, a server of a distributed system, or a server combined with a block-chain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of processing an image, comprising:
processing a to-be-processed image to obtain a feature point of the to-be-processed image, a feature point descriptor map of the to-be-processed image, and a dense descriptor map of the to-be-processed image;
determining a pair of matched feature points between the to-be-processed image and a reference image, based on the feature point and the feature point descriptor map; and
determining a pair of matched pixels between the to-be-processed image and the reference image, based on the dense descriptor map,
wherein the processing a to-be-processed image to obtain a feature point of the to-be-processed image, a feature point descriptor map of the to-be-processed image and a dense descriptor map of the to-be-processed image comprises:
inputting the to-be-processed image into a multi-task processing model to obtain the feature point of the to-be-processed image, the feature point descriptor map of the to-be-processed image and the dense descriptor map of the to-be-processed image,
wherein the multi-task processing model comprises a feature point classification branch, and the method further comprises:
inputting the to-be-processed image into the feature point classification branch to obtain a feature point category result, so as to determine the pair of matched feature points between the to-be-processed image and the reference image based on the feature point, the feature point descriptor map and the feature point category result,
wherein the determining a pair of matched feature points between the to-be-processed image and a reference image based on the feature point and the feature point descriptor map comprises:
screening the feature point based on the feature point category result, so as to determine a target feature point; and
determining the pair of matched feature points between the to-be-processed image and the reference image based on the target feature point and the feature point descriptor map, and
wherein the determining the pair of matched feature points between the to-be-processed image and the reference image based on the target feature point and the feature point descriptor map comprises:
extracting, from the feature point descriptor map, a feature point descriptor matched with the target feature point based on the target feature point; and
determining, by using a feature point matching method, the pair of matched feature points between the to-be-processed image and the reference image based on the target feature point and the feature point descriptor matched with the target feature point.

2. The method according to claim 1, wherein the multi-task processing model further comprises a feature point extraction branch, a feature point descriptor map calculation branch and a dense descriptor map calculation branch, and
the inputting the to-be-processed image into a multi-task processing model to obtain the feature point of the to-be-processed image, the feature point descriptor map of the to-be-processed image and the dense descriptor map of the to-be-processed image comprises:
inputting the to-be-processed image into the feature point extraction branch to obtain the feature point;
inputting the to-be-processed image into the feature point descriptor map calculation branch to obtain the feature point descriptor map; and
inputting the to-be-processed image into the dense descriptor map calculation branch to obtain the dense descriptor map.

3. The method according to claim 2, wherein the feature point extraction branch comprises a plurality of feature point extraction sub branches, and
the inputting the to-be-processed image into the feature point extraction branch to obtain the feature point comprises:
inputting the to-be-processed image into the plurality of feature point extraction sub branches, so as to obtain a plurality of feature point scoring maps, wherein the plurality of feature point scoring maps correspond to the plurality of feature point extraction sub branches one by one;
performing a weighted summation on the plurality of feature point scoring maps to obtain a target feature point scoring map; and
performing an interpolation processing on the target feature point scoring map to obtain the feature point.

4. The method according to claim 2, wherein the dense descriptor map comprises a high-resolution dense descriptor map and a low-resolution dense descriptor map, and the dense descriptor map calculation branch comprises a high-resolution dense descriptor map calculation sub branch and a low-resolution dense descriptor map calculation sub branch, and
wherein the determining a pair of matched pixels between the to-be-processed image and the reference image based on the dense descriptor map comprises:
determining a candidate pair of matched pixels between the to-be-processed image and the reference image based on the low-resolution dense descriptor map, wherein the low-resolution dense descriptor map is obtained by processing the to-be-processed image using the low-resolution dense descriptor map calculation sub branch; and
determining, from the candidate pair of matched pixels, the pair of matched pixels between the to-be-processed image and the reference image based on the high-resolution dense descriptor map, wherein the high-resolution dense descriptor map is obtained by processing the to-be-processed image using the high-resolution dense descriptor map calculation sub branch.

5. The method according to claim 1, wherein the feature point classification branch comprises a plurality of feature point classification sub branches, a fusion module, and a classifier, and each of the plurality of feature point classification sub branches comprises a feature point classification extraction module, an encoder, and a fusion module, and
the inputting the to-be-processed image into the feature point classification branch to obtain a feature point category result comprises:
inputting the to-be-processed image into the plurality of feature point classification extraction modules, so as to obtain a plurality of feature point category feature maps, wherein the plurality of feature point category feature maps correspond to the plurality of feature point classification extraction modules one by one;
inputting, for each feature point category feature map of the plurality of feature point category feature maps, the feature point category feature map into the encoder so as to obtain a plurality of encoded sub feature point category feature maps, wherein the plurality of encoded sub feature point category feature maps correspond to a plurality of encoders one by one;

processing the plurality of encoded sub feature point category feature maps by using the fusion module, so as to obtain a fused feature point category map; and processing the fused feature point category map by using the classifier, so as to obtain the feature point category result.

6. The method according to claim 1, further comprising:

inputting the reference image into the multi-task processing model to obtain a reference feature point, a reference feature point descriptor map and a reference dense descriptor map, so as to determine the pair of matched feature points between the to-be-processed image and the reference image based on the feature point, the feature point descriptor map, the reference feature point and the reference feature point descriptor map, and determine the pair of matched pixels between the to-be-processed image and the reference image based on the dense descriptor map and the reference dense descriptor map.

7. A method of training the a multi-task processing model implemented in the method according to claim 1, comprising:

training an initial multi-task processing model by using a training sample, so as to obtain the multi-task processing model, wherein the training sample comprises a first sample image, a second sample image, a label for a pair of matched feature points between the first sample image and the second sample image, and a label for a pair of matched pixels between the first sample image and the second sample image, and wherein the label for the pair of matched feature points is configured to represent a matching relationship between a feature point of the first sample image and a feature point of the second sample image, and the label for the pair of matched pixels is configured to represent a matching relationship between a pixel point of the first sample image and a pixel point of the second sample image.

8. The method according to claim 7, wherein the initial multi-task processing model comprises an initial feature point extraction branch and an initial feature point descriptor map calculation branch, and the training an initial multi-task processing model by using a training sample so as to obtain the multi-task processing model comprises:

training the initial feature point extraction branch and the initial feature point descriptor map calculation branch by using the first sample image, the second sample image, and the label for the pair of matched feature points between the first sample image and the second sample image, so as to obtain a feature point extraction branch and a feature point descriptor map calculation branch in the multi-task processing model.

9. The method according to claim 7, wherein the initial multi-task processing model comprises an initial dense descriptor map calculation branch, and the training an initial multi-task processing model by using a training sample so as to obtain the multi-task processing model comprises:

training the initial dense descriptor map calculation branch by using the first sample image, the second sample image, and the label for the pair of matched pixels between the first sample image and the second sample image, so as obtain a dense descriptor map calculation branch in the multi-task processing model.

10. The method according to claim 7, wherein the initial multi-task processing model further comprises an initial feature point classification branch, and the training an initial multi-task processing model by using a training sample so as to obtain the multi-task processing model comprises:

training the initial feature point classification branch by using a target sample image, a feature point label of the target sample image, and a category label of the target sample image, so as to obtain a feature point classification branch of the multi-task processing model, wherein the target sample image comprises the first sample image and/or the second sample image; the feature point label of the target sample image is configured to represent a probability value that a pixel point of the target sample image is a feature point; and the category label of the target sample image is configured to represent a category of the pixel point.

11. An electronic device, comprising:

at least one processor; and a memory communicatively connected to the at least one processor, wherein the memory stores instructions executable by the at least one processor, and the instructions, when executed by the at least one processor, are configured to cause the at least one processor to at least:

process a to-be-processed image to obtain a feature point of the to-be-processed image, a feature point descriptor map of the to-be-processed image, and a dense descriptor map of the to-be-processed image;

determine a pair of matched feature points between the to-be-processed image and a reference image, based on the feature point and the feature point descriptor map; and determine a pair of matched pixels between the to-be-processed image and the reference image, based on the dense descriptor map, wherein the instructions are further configured to cause the at least one processor to at least:

input the to-be-processed image into a multi-task processing model to obtain the feature point of the to-be-processed image, the feature point descriptor map of the to-be-processed image and the dense descriptor map of the to-be-processed image, wherein the multi-task processing model comprises a feature point classification branch, and wherein the instructions are further configured to cause the at least one processor to at least:

input the to-be-processed image into the feature point classification branch to obtain a feature point category result, so as to determine the pair of matched feature points between the to-be-processed image and the reference image based on the feature point, the feature point descriptor map and the feature point category result, wherein the instructions are further configured to cause the at least one processor to at least:

screen the feature point based on the feature point category result, so as to determine a target feature point; and determine the pair of matched feature points between the to-be-processed image and the reference image based on the target feature point and the feature point descriptor map, and wherein the instructions are further configured to cause the at least one processor to at least:

extract, from the feature point descriptor map, a feature point descriptor matched with the target feature point based on the target feature point; and determine, by using a feature point matching method, the pair of matched feature points between the to-be-processed image and the reference image based on the target feature point and the feature point descriptor matched with the target feature point.

12. The electronic device according to claim 11, wherein the multi-task processing model further comprises a feature point extraction branch, a feature point descriptor map calculation branch and a dense descriptor map calculation branch, and wherein the instructions are further configured to cause the at least one processor to at least:

input the to-be-processed image into the feature point extraction branch to obtain the feature point;

input the to-be-processed image into the feature point descriptor map calculation branch to obtain the feature point descriptor map; and input the to-be-processed image into the dense descriptor map calculation branch to obtain the dense descriptor map.

13. The electronic device according to claim 12, the feature point extraction branch comprises a plurality of feature point extraction sub branches, and wherein the instructions are further configured to cause the at least one processor to at least:

input the to-be-processed image into the plurality of feature point extraction sub branches, so as to obtain a plurality of feature point scoring maps, wherein the plurality of feature point scoring maps correspond to the plurality of feature point extraction sub branches one by one;

perform a weighted summation on the plurality of feature point scoring maps to obtain a target feature point scoring map; and perform an interpolation processing on the target feature point scoring map to obtain the feature point.

14. An electronic device, comprising:

at least one processor; and a memory communicatively connected to the at least one processor, wherein the memory stores instructions executable by the at least one processor, and the instructions, when executed by the at least one processor, are configured to cause the at least one processor to implement the method of training the multi-task processing model according to claim 7.

* * * * *